(12) United States Patent
Furumura (10) Patent No.: US 8,440,487 B2
(45) Date of Patent: May 14, 2013

(54) METHODS FOR MANUFACTURING RADIO FREQUENCY (RF) POWDER

(75) Inventor: Yuji Furumura, Yokohama (JP)

(73) Assignee: Philtech Inc., Tokyo (JP)

( * ) Notice: Subject to any disclaimer, the term of this patent is extended or adjusted under 35 U.S.C. 154(b) by 0 days.

(21) Appl. No.: 13/404,667

(22) Filed: Feb. 24, 2012

(65) Prior Publication Data

US 2012/0152890 A1    Jun. 21, 2012

Related U.S. Application Data

(62) Division of application No. 12/153,661, filed on May 22, 2008, now Pat. No. 8,188,924.

(51) Int. Cl.
*H01L 21/00* (2006.01)

(52) U.S. Cl.
USPC ............. 438/48; 438/68; 438/113; 438/458; 438/459; 438/464; 257/E21.599

(58) Field of Classification Search ............ 438/48, 438/68, 113, 114, 458–459, 460, 464–465; 257/E21.599
See application file for complete search history.

(56) References Cited

U.S. PATENT DOCUMENTS

| | | | |
|---|---|---|---|
| 3,713,148 | A | 1/1973 | Cardullo et al. |
| 5,204,681 | A | 4/1993 | Greene |
| 5,528,222 | A | 6/1996 | Moskowitz et al. |
| 5,581,257 | A | 12/1996 | Greene et al. |
| 6,517,900 | B1 | 2/2003 | Pierre |
| 6,534,387 | B1 | 3/2003 | Shinogi et al. |
| 6,744,335 | B2 * | 6/2004 | Ryhanen et al. ............ 333/185 |
| 7,005,324 | B2 * | 2/2006 | Imai .............................. 438/113 |
| 7,061,083 | B1 | 6/2006 | Usami et al. |
| 7,271,076 | B2 | 9/2007 | Yamazaki et al. |
| 7,508,305 | B2 | 3/2009 | Yamazaki et al. |
| 7,632,721 | B2 | 12/2009 | Yamazaki et al. |
| 7,667,310 | B2 | 2/2010 | Dozen et al. |
| 7,683,838 | B2 | 3/2010 | Koyama et al. |
| 7,764,174 | B2 | 7/2010 | Rodgers |

(Continued)

FOREIGN PATENT DOCUMENTS

| | | |
|---|---|---|
| JP | 05-151428 A | 6/1993 |
| JP | 10-171951 A | 6/1998 |

(Continued)

OTHER PUBLICATIONS

U.S. Notice of Allowance mailed Jan. 12, 2011 as received in U.S. Appl. No. 12/153,661.

(Continued)

*Primary Examiner* — Michael Trinh
(74) *Attorney, Agent, or Firm* — Maschoff Brennan (57) ABSTRACT

The present disclosure provides methods for manufacturing a radio frequency (RF) powder including a plurality of RF particles, each of which includes a circuit element. A plurality of circuit elements, each corresponding to a different RF particle, may be formed on a first surface of a substrate. Grooves may be etched into the first surface of the substrate between the plurality of circuit elements. A protection film may be formed on each of the plurality of circuit elements and a portion of the substrate between a second, opposite surface of the substrate and bottoms of the grooves may be removed so that each of the plurality of circuit elements is associated with the remaining portion of the substrate.

20 Claims, 8 Drawing Sheets

U.S. PATENT DOCUMENTS

| | | | |
|---|---|---|---|
| 7,799,147 | B2 | 9/2010 | Matsukawa et al. |
| 8,178,415 | B2 * | 5/2012 | Furumura et al. ............ 438/360 |
| 2005/0214984 | A1 * | 9/2005 | Maruyama et al. ............ 438/149 |
| 2006/0234512 | A1 * | 10/2006 | Yuasa et al. ................. 438/710 |
| 2007/0166957 | A1 * | 7/2007 | Kameyama et al. .......... 438/459 |
| 2008/0224937 | A1 | 9/2008 | Kimura et al. |
| 2008/0231445 | A1 | 9/2008 | Rodgers |
| 2010/0067166 | A1 | 3/2010 | Furumura et al. |
| 2010/0071746 | A1 | 3/2010 | Furumura et al. |
| 2010/0081235 | A1 | 4/2010 | Furumura et al. |
| 2010/0090925 | A1 | 4/2010 | Furumura et al. |

FOREIGN PATENT DOCUMENTS

| | | | |
|---|---|---|---|
| JP | 2001-176899 | A | 6/2001 |
| JP | 2001-266097 | A | 9/2001 |
| JP | 2002-329684 | A | 11/2002 |
| JP | 2003-179005 | A | 6/2003 |
| JP | 2004-078991 | A | 3/2004 |
| JP | 2005-203751 | A | 7/2005 |
| JP | 2005-209104 | A | 8/2005 |
| JP | 2005-242629 | A | 9/2005 |
| JP | 2005-252242 | A | 9/2005 |
| JP | 2007-128433 | A | 5/2007 |
| JP | 2007-128434 | A | 5/2007 |
| JP | 2008-134694 | A | 6/2008 |
| JP | 2008-134816 | A | 6/2008 |
| JP | 2008-135446 | A | 6/2008 |
| JP | 2008-135951 | A | 6/2008 |

OTHER PUBLICATIONS

U.S. Office Action mailed May 24, 2011 as received in U.S. Appl. No. 12/153,661.

U.S. Office Action mailed Sep. 24, 2010 as received in U.S. Appl. No. 12/153,661.

U.S. Notice of Allowance mailed Oct. 17, 2011 as received in U.S. Appl. No. 12/153,661.

Usami et al., "An SOI-Based 7.5 μm-Thick 0.15×0.15 mm sq RFID Chip," 2006 IEEE International Solid-State Circuits Conference, 10 Pages.

Kamal Sarabandi, "Compact Reconfigurable HF-UHF Antennas," Jun. 7, 2004, http://www.stormingmedia.us/61/6100/A610034. html., 134 pages.

Tetsuo Nozawa, "Hitachi Achieves 0.05-mm Square Super Micro RFID Tag, 'Further Size Reductions in Mind'," Tech-On Nikkei Business Publications, Feb. 20, 2007, http://techon.nikkeibp.co.jp/english/NEWS_EN/20070220/127959/, 2 pages.

Nakamoto, Hiroyuki, "A PassiveUHF RF Identification CMOS Tag IC Using Ferroelectric RAM in 0.35um Technology", IEEE Journal of Solid-State Circuits, vol. 42, Jan. 2007, pp. 101-110.

US Office Action dated Jun. 10, 2011 as received in U.S. Appl. No. 12/153,662.

Chen, Liu, Thermal Modeling for System-in-a-Package Based on Embedded Chip Structure, Oct. 2005, Polymers and Adhesives in Microelectronics and Photonics, Pllytronic, 2005, 5th International Conference, pp. 224-227.

Daily, Linda, Hitachi Researchers Develop Powder-Sized RFID Chips, IEEE Computer Society, May 2007, p. 23.

Miller, Paul, Hitachi's RFID powder freaks us the heck out, Feb. 14, 2007, http:/www.engadget.com/2007/02/14/hitachix -rfid-powder-freaks-us-the-heck-out , 1 page.

Mura et al., RF-Powder: Fabrication of 0.15 mm-Si-powder Resonating at Microwave Frequencies, Microwave Conference (Proceedings of the 37th European Microwane Conference), Oct. 2007, Munich, Germany, pp. 392-395.

Usami, Mitsuo, An Ultra-Small RFID Chip: mu chip, 2004 IEEE Asia Pacific Conference on Advanced System Integrated Circuits (AP-ASIC2004) Aug. 4-5, 2004 pp. 2-5.

Usami, Mitsuo, "The μ-Chip, an Ultra-Small 2.45 GHz RFID Chip for Ubiquitous Recognition Applications," Applied Physics, 2004, p. 1179-1183, vol. 73, No. 9, Japan.

Yoshiko, Hara, Hitachi advances paper-thin RFID chip, Feb. 6, 2006 EETimes News & Analysis, 1 page.

US Office Action dated Jul. 29, 2010 as received in U.S. Appl. No. 12/153,662.

US Office Action dated Jan. 11, 2011 as received in U.S. Appl. No. 12/153,662.

* cited by examiner

METHODS FOR MANUFACTURING RADIO FREQUENCY (RF) POWDER

CROSS-REFERENCE TO RELATED APPLICATION

This patent application is a divisional of U.S. Pat. No. 8,188,924, issued May 29, 2012, which is incorporated herein by reference.

TECHNICAL FIELD

The present disclosure relates to a radio frequency (RF) powder and a method for manufacturing the same and in particular to, an RF powder which is used as a powder and is made to be contained in paper or the like to thereby allow information or the like to be read by a radio frequency electromagnetic field (radio wave) given from the outside, and a method for manufacturing the same.

BACKGROUND

Currently, it is considered that integrated circuit (IC) tags are products indicating the beginning of the ubiquitous age. Labels, Suica cards, FeRAM cards, or the like have been developed previously as RF-ID (micro radio identification). Many people expect that the IC tag market will certainly grow larger in the future. However, the market has not grown enough as expected. The reason is that there are problems such as cost, security, and privacy other than technologies, which must be solved socially.

The cost of the IC tag can be reduced by reducing the size of the IC tag chip. It is because the number of IC tag chips obtained from one wafer can be increased if the size of the IC tag chips is reduced. At present, an IC tag chip of 0.4 millimeters square has been developed. This IC tag chip can read 128-bit memory data in the chip with a microwave of 2.45 GHz (for example, refer to Non-patent Document 1).

According to a conventional manufacturing method, however, there have been problems described below when the micro IC tag chips are manufactured from one wafer.

The conventional method for manufacturing the IC tag chips are described, for example, Patent Document 1. According to the manufacturing method, a wafer in which ICs are formed on a front surface is subjected to a back grinding process, and a back surface of the wafer is polished to reduce a thickness of the wafer. After that, the wafer is subjected to a dicing process to separate a large number of IC tag chips with a predetermined shape. In the dicing process, the wafer is cut with a dicing saw to be separated into a large number of IC tag chips. With the separation method for cutting the wafer along dicing lines with the dicing saw, wafer areas, such as considerable areas used for the cutting, areas influenced by the cutting process, and the like, cannot be used for manufacturing the IC tag chips. Furthermore, the smaller the IC tag chips become, the further increases the number of dicing lines, and thus a ratio of unusable area to the whole wafer is increased, thereby making it impossible to use the wafer effectively. Namely, the number of IC tag chips which can be cut out from one wafer is decreased.

For that reason, a new method for separating semiconductor devices is proposed in order so solve the above-described problems in Patent Document 1. According to the method for separating the semiconductor devices in Patent Document 1, half cuts are formed by etching the separating positions for separating the semiconductor devices, from a front surface of the wafer on which circuits are formed; a tape material is adhesively attached on the front surface of the wafer; a back surface of the wafer is then mechanically polished by only a predetermined thickness while leaving a remaining portion so as not to communicate with the half cutting on the front surface; etching or chemical mechanical polishing is performed from the back surface of the wafer; and the wafer is finally separated into individual semiconductor devices. Since the half cut is formed by etching as described above, cut-out portions can be reduced while a width of the half cutting can also be narrowed, and thus allowing the number of the semiconductor devices obtained from one wafer to be increased.

Patent Document 1: Japanese Unexamined Patent Publication (Kokai) No. 2003-179005.

Non-patent Document 1: "Micro Radio IC Tag Chip 'M-Chip'" by Mitsuo Usami in Applied Physics, Vol. 73, No. 9, 2004, p. 1179-p. 1183.

SUMMARY

Technologies described herein generally include methods for manufacturing an RF powder composed of a large quantity of particles, wherein a single particle thereof has an integrated circuit formed on a substrate, an insulating layer formed on the integrated circuit, and an antenna element formed on the insulating layer. The method may include forming a plurality of circuit elements, each corresponding to a different RF particle, on a first surface of a substrate, the substrate further including a second surface that is opposite the first surface; etching grooves into the first surface of the substrate between the plurality of circuit elements; forming a protection film on each of the plurality of circuit elements; and removing a first portion of the substrate that is between the second surface of the substrate and bottoms of the grooves so that each of the plurality of circuit elements is associated with a different remaining portion of the substrate.

Technologies described herein generally include methods for manufacturing an RF powder composed of a large quantity of particles, wherein a single particle thereof has a resonance circuit which is formed on a substrate and is responsive to an external electromagnetic field. The method may include forming a plurality of integrated circuits, each corresponding to a different RF particle, on a first surface of a substrate, the substrate further including a second surface that is opposite the first surface, etching grooves into the first surface of the substrate between the plurality of integrated circuits forming a protection film on each of the plurality of integrated circuits, attaching a strengthening plate to the protection film with an adhesive that fills the grooves, removing a first portion of the substrate that is between the second surface of the substrate and bottoms of the grooves so that each of the plurality of integrated circuits is associated with a different remaining portion of the substrate and removing the adhesive such that the support plate separates from the RF particles leaving each RF particle disconnected from each other RF particle.

Technologies described herein generally include methods for manufacturing a RF powder comprising a plurality of RF particles, each RF particle comprising a resonance circuit. The methods may include forming a plurality of resonators, each corresponding to a different RF particle, on a first surface of a substrate, the substrate further including a second surface that is opposite the first surface, etching grooves into the first surface of the substrate between the plurality of resonators, forming a protection film on each of the plurality of resonators, attaching a strengthening plate to the protection film with an adhesive that fills the grooves, removing a first portion of the substrate that is between the second surface of the substrate and bottoms of the grooves so that each of the plurality of resonators is associated with a different remaining portion of the substrate and removing the adhesive such that the support plate separates from the RF particles leaving each RF particle disconnected from each other RF particle According to the present disclosure, since the particles are not individually used as the single IC tag chip but is collectively used as the RF powder, the treatment is easy and it can be manufactured at low cost. Additionally, according to the present disclosure, since the protection film forming process of covering with the protection film the circumference of the particle is provided before separating the wafer into the particles, the protection film can be uniformly applied to each particle.

Moreover, when the back surface of the wafer is polished as a pre-processing in order to separate the wafer into each particle of the RF powder, paraffin or the like is coated on the front surface of the wafer to past the ceramic plate thereon, and the inside of the cut groove for separation formed on the front surface of the wafer is further filled and solidified with the paraffin or the like, thus making it possible to polish the cut groove up to the bottom by mechanical polishing without causing cracks, chaps, or the like. For this reason, the whole manufacturing process of the RF powder is simplified, thus allowing the manufacturing cost to be reduced.

DETAILED DESCRIPTION

Hereinafter, preferred embodiments (examples) according to the present disclosure will be explained based on accompanying drawings.

Figure 1:
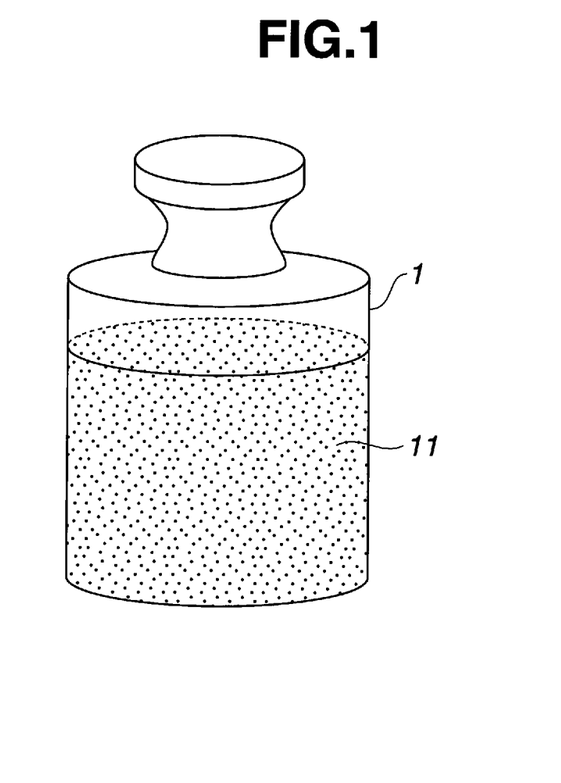
FIG. 1 is a view showing an aspect of use and management of RF powder according to a first embodiment of the present disclosure.

FIGS. 1 through 6 show a first embodiment of an RF powder according to the present disclosure. FIG. 1 shows an aspect of use and storage management of the RF powder. FIG. 1 shows that an RF powder 11 is contained in a container 1 such as a bottle or the like. The RF powder 11 according to the present disclosure is always in a form of being used as a powder (powdery substance or powder particulate matter).

Figure 2:
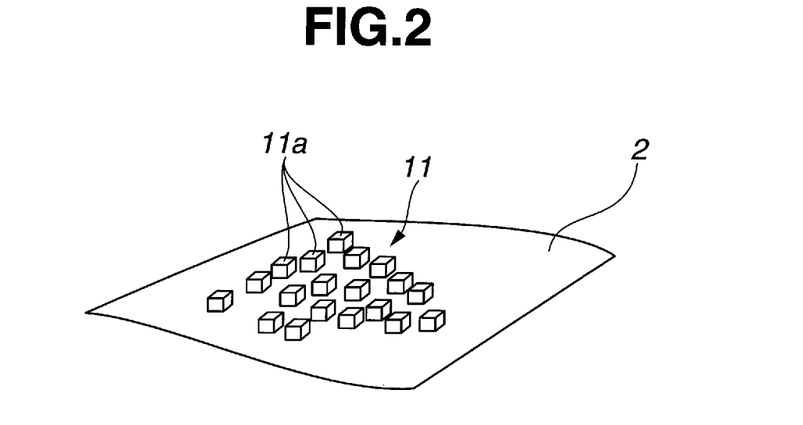
FIG. 2 is a view showing some exaggerated and enlarged powder particles taken out from the RF powder according to the first embodiment.

FIG. 2 is a view in which a plurality of particles 11a of the RF powder 11 are taken out from the container 1 and are placed on a sheet-like member 2 such as rectangular paper, and each particle 11a is enlargedly shown. In FIG. 2, a size of each particle 11a composing the RF powder 11 is exaggeratedly shown. Note that a thickness of each particle 11a on the sheet-like member 2 is shown without exaggeration. Hereinafter, the "particle 11a" will be described as a "powder particle 11a."

Figure 3:
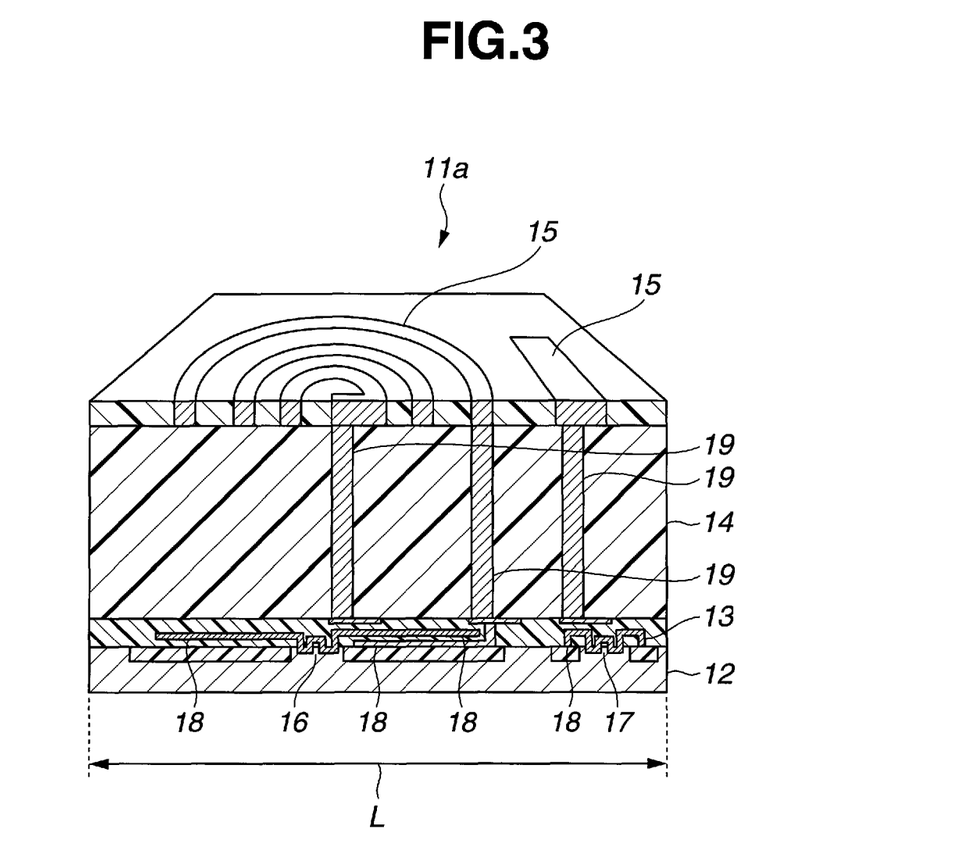
FIG. 3 is a three dimensional view showing a sectional main part of a single powder particle of the RF powder according to the first embodiment.

FIG. 3 shows a main part longitudinal section of one of the plurality of powder particles 11a shown in FIG. 2. In FIG. 3, a thickness of the powder particle 11a of the RF powder 11 is exaggeratedly shown. The powder particle 11a has a three-dimensional shape, in which with respect to a plurality of rectangular planes in outer front surfaces thereof, a size of the rectangular plane is not less than 0.05 millimeters square and not more than 0.30 millimeters square, and more preferably 0.15 millimeters square. In the powder particle 11a according to the present embodiment, a side L in the front shown in FIG. 3 is 0.15 millimeters (150 micrometers).

Each of a large quantity of powder particles 11a composing the RF powder 11 has an integrated circuit (IC) 13 provided with a memory function, such as FeRAM, formed on a substrate 12 such as silicon or the like, an insulating layer 14 with a thickness of approximately 30 micrometers formed on the integrated circuit 13, and an antenna element 15 responsive to an electromagnetic field with a specific frequency (for example, 2.45 GHz) formed on the insulating layer 14. In FIG. 3, transistors 16 and 17 which configure the integrated circuit 13, interconnections 18 connected to the transistors 16 and 17, and interconnections 19 for connecting the antenna element 15 and the integrated circuit 13 are shown as an example of electrical circuit elements. The interconnections 19 are embedded in the insulator 14.

Figure 4:
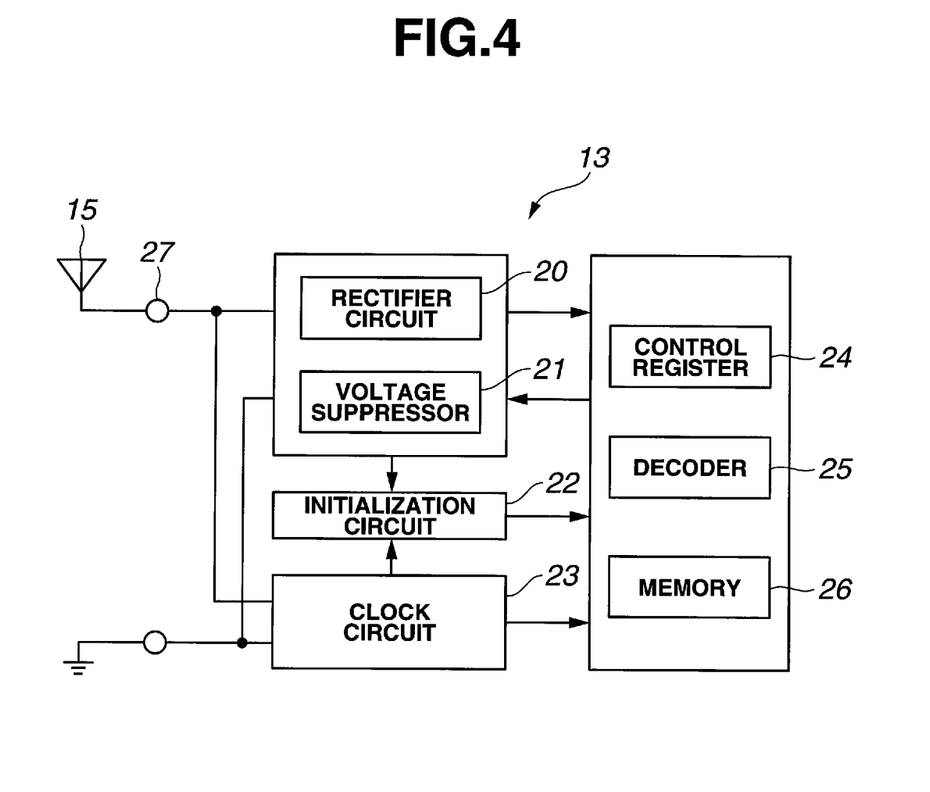
FIG. 4 is a block diagram showing an example of a circuit configuration of an integrated circuit which is contained in a single powder particle of the RF powder according to the first embodiment.

FIG. 4 shows one example of a circuit configuration of the integrated circuit 13 provided in each powder particle 11a of the RF powder 11. The integrated circuit 13 is provided with a rectifier circuit 20, a voltage suppressor 21, an initialization circuit 22, a clock circuit 23, a control register 24, a decoder 25, and a memory 26, for example. These circuit elements have following functions, respectively.

The rectifier circuit 20 has a function of rectifying radio-frequency electromagnetic waves incoming from the outside into a DC power supply voltage. For example, the 2.45 GHz electromagnetic wave which is introduced via the antenna 15 and an antenna terminal 27 is converted into a voltage for operating internal analog circuits and digital circuits by the rectifier circuit 20. When the powder particles 11a of the RF powder 11 approach a reader/writer 32 (refer to FIG. 5) and the rectifier circuit 20 generates the excessive voltage in response to excessive electromagnetic wave energy from the reader/writer 32, the voltage suppressor 21 suppresses the voltage and prevents semiconductor devices in the integrated circuit 13 from being damaged. The initialization circuit 22 controls start and end of the circuit operation and the clock circuit 23 demodulates a clock waveform. The memory 26 is, for example, an FeRAM in which identification numbers are stored. Contents in the memory 26 are selected by the control register 24 and the decoder 25 to be transmitted to the reader/writer 32.

Next, with reference to FIGS. 5 and 6, an actual use example of the RF powder 11 according to the first embodiment will be explained.

A considerable number of powder particles 11a of the RF powder 11 are made to be contained in a sheet member 30, which is a medium such as paper or the like. A thickness of the sheet member 30 is exaggeratedly and enlargedly shown in FIG. 5. When the RF powder is made to be contained in the sheet members 30 such as bills, aqueous solutions (ink, paint, or the like) filled with an adhesive fixative containing the RF powder 11 is made to soak into the sheet member 30 with a dropper or the like, for example. Thus, the RF powder 11 can be attached on a surface of the sheet member 30, or can be made to soak inside the sheet member 30. At this time, each powder particle 11a is made to soak without inspection. Namely, each powder particle 11a needs not to be particularly inspected whether it is normal or abnormal. FIG. 5 shows a state where a plurality of powder particles 11a of the RF powder 11 are made to soak inside the sheet member 30 to be arranged. Note herein that, when the powder particles 11a are mixed into the media such as paper or the like, the powder particles 11a may be mixed thereinto at a step of manufacturing the media such as the paper or the like.

The sheet member 30 in which a plurality of powder particles 11a of the RF powder 11 are made to be contained are scanned with the reader/writer 32 which is connected to a computer 31, and information included in each of the powder particles 11a is read. The computer 31 is provided with a display 31a, a main unit 31b, a keyboard 31c, or the like.

The above-described reader/writer 32 has a read terminal 33 (refer to FIG. 6) and reads information provided from each powder particle 11a using radio-frequency electromagnetic waves (RF) in a specific frequency band including 2.45 GHz by the read terminal 33. Frequencies used in each of the plurality of powder particles 11a are different from each other, and are, for example, 1.9 GHz, 2 GHz, 2.50 GHz, and 2.54 GHz. Hence, the reader/writer 32 is configured to read the electromagnetic waves of, for example, 1.9 to 2.54 GHz frequency band as the above-described specific frequency band at proper timing. In order to read information from each of the plurality of powder particles 11a in the sheet member 30 via the read terminal 33, the reader/writer 32 performs a scanning operation in a certain direction along the surface of the sheet member 30, and also changes the frequency used for transmission/reception within the specific frequency band.

Figure 6:
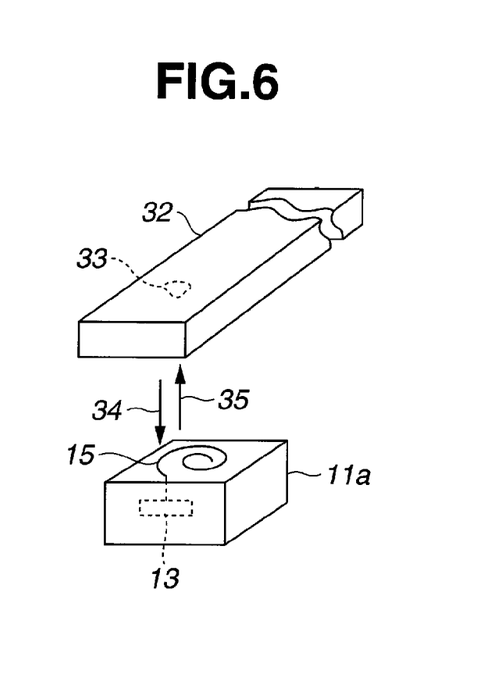
FIG. 6 is a view showing a transmission/reception relation of a radio-frequency electromagnetic wave with a reader/writer in an existence position of the single powder particle.

FIG. 6 shows a state where signals (information) are transmitted and received based on the radio-frequency electromagnetic wave given from the reader/writer 32 in an existence position of a certain powder particle 11a which is contained in the RF powder 11. Assuming that the read terminal 33 provided in a bottom surface of the reader/writer 32 performs a scanning operation by scanning movements of the reader/writer 32 and is located above the powder particle 11a of the RF powder 11. In this case, the read terminal 33 radiates the radio-frequency electromagnetic waves with several different frequencies, and when the electromagnetic wave with a frequency to which the powder particle 11a is responsive is radiated (an arrow 34 shown in FIG. 6), the powder particle 11a receives the radio-frequency electromagnetic wave, operates the integrated circuit 13 based on the energy thereof, and extracts information from the memory 26 to radiate it as the radio-frequency electromagnetic wave (an arrow 35 shown in FIG. 6). The electromagnetic wave radiated by the powder particle 11a is received by the read terminal 33 in the reader/writer 32. The read terminal 33 of the reader/writer 32 transmits the information received from the powder particle 11a to the computer 31, and the information provided from the powder particle 11a is memorized in the memory of the computer 31 in a position where there is the powder particle 11a.

Figure 5:
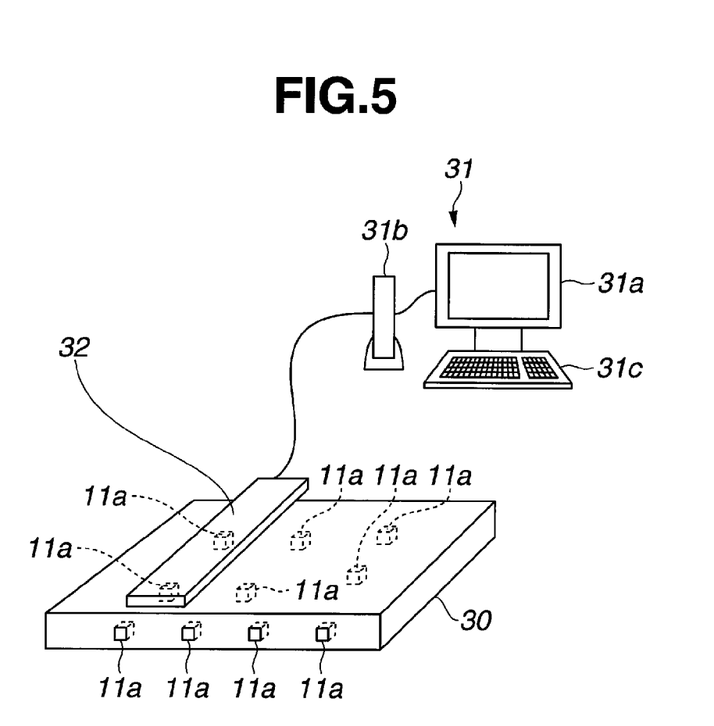
FIG. 5 is a device configuration illustrating an actual application of the RF powder according to the first embodiment.

By the reader/writer 32 scanning over the whole inside and surface of the sheet member 30 shown in FIG. 5, the information written in each of the RF powder 11 (a large number of powder particles 11a) which exist throughout a scanning area in the sheet member 30 is read and then memorized in the memory of the computer 31. The information memorized in the memory of the computer 31 is displayed on a display 31a thereof if needed.

Producing bills by making the above-described RF powder 11 to be contained in the bills using the above-described method, or making the RF powder 11 to be contained in important documents such as official documents, licenses, insurance cards, the other important cards, or the like makes it possible to utilize the RF powder 11 for forgery discrimination of the bills, authentication of the important documents, or the like. Additionally, since the RF powder 11 is used as the powder (powdery substance) of collectively utilizing a plurality or a large number of powder particles 11a instead of using it as a single IC tag chip in this case, the treatment is easy.

Next, with reference to FIGS. 7 and 8, a method for manufacturing the RF powder 11 according to the first embodiment will be explained.

Figure 7:
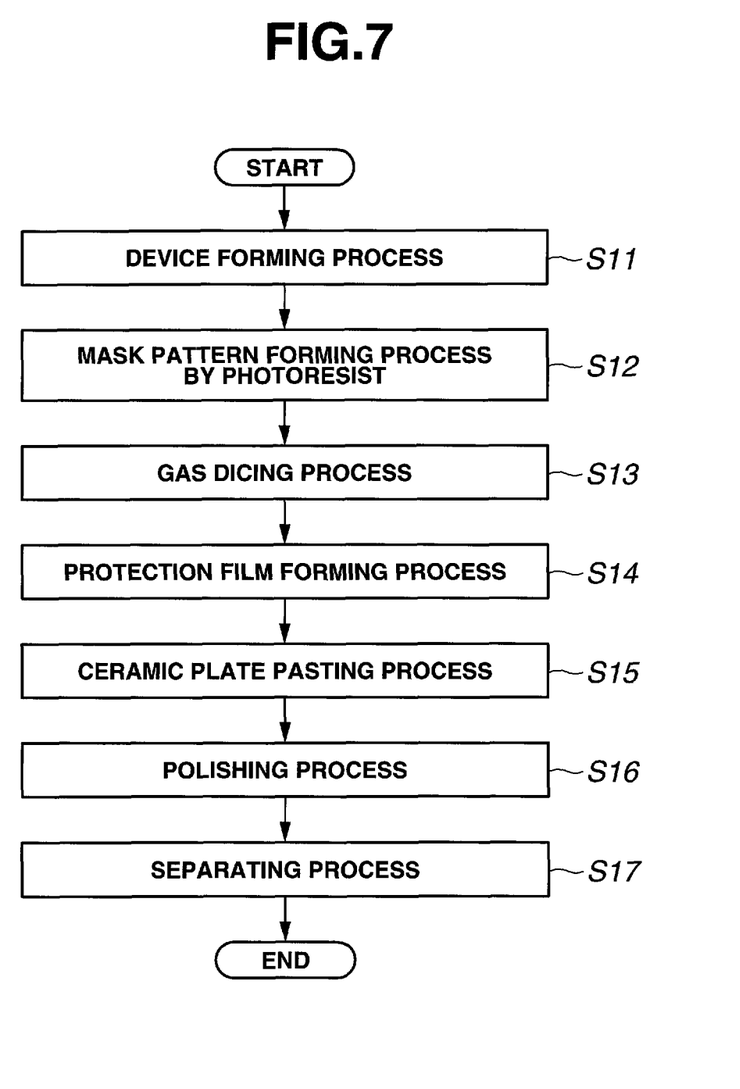
FIG. 7 is a flow chart showing a process of a method for manufacturing the RF powder according to the first embodiment of the present disclosure.

FIG. 7 shows the whole process of manufacturing the RF powder 11, while FIGS. 8A through 8G show longitudinal sectional structures of the wafer or the powder particle 11a corresponding to each process.

The method for manufacturing the RF powder 11 includes a device forming process (step S11), a resist pattern forming process (step S12), a gas dicing process (step S13), a protection film forming process (step S14), a ceramic plate pasting process (step S15), a polishing process (step S16), and a separating process (step S17).

Each of the above-described processes S11 to S17 will be briefly explained. The device forming process S11 is a process of forming a large number of (a large quantity of) integrated circuit elements (39) with antenna on the wafer. The resist pattern forming process S12 is a process of forming resist patterns on the front surface of the wafer on which a large number of integrated circuit elements with antenna are formed. The gas dicing process S13 is a process of forming cut grooves using gas. The protection film forming process S14 is a process of forming the protection film for every integrated circuit element with antenna. The ceramic pasting process S15 is a process of pasting a strengthening plate such as a ceramic plate or the like, on the front surface of the wafer with adhesive such as paraffin, luster, or wax, which is dissolved in an organic solvent. The polishing process S16 is a process of polishing the back surface of the wafer until reaching bottoms of the above-described cut grooves. The separating process S17 is a process of dissolving the adhesive such as paraffin or the like in chemicals and then separating the integrated circuit elements with antenna, namely, the powder particles 11a, to thereby produce a large quantity of powder particles 11a. Hereinafter, each of above-described processes will be explained in more detail.

In the above-described device forming process S11, a large number of (a large quantity of) integrated circuits are formed on the front surface of the wafer composed of silicon or the like, using the front surface area except for dicing lines, an insulating film (oxide film or the like) is also formed with a thickness of approximately 30 micrometers on the front surface of the wafer on which the integrated circuits are formed, and antenna elements composed of inductors or the like are formed on the insulating film. The antenna element is formed corresponding to each integrated circuit, and the corresponding integrated circuit and antenna element are electrically connected with the embedded interconnection formed inside the insulator. The integrated circuit element with antenna described above is a semiconductor device composed of a set of integrated circuits, a set of antenna elements corresponding thereto, the interconnections, or the like. In FIGS. 8A through 8G, reference numeral 39 denotes the integrated circuit element with antenna. As exposure technologies used for forming a large number of micro integrated circuits on the front surface of the wafer and for forming the antenna elements on the insulator with a thickness of 30 micrometers further deposited on the front surface of the wafer, exposure technologies with parallel rays, or more preferably, exposure technologies with an X-ray is used in general. Irregularities are formed on the surface of the insulating film when the above-described insulating film is formed with a thickness of 30 micrometers, and thus transference cannot be performed by a common reduced projection light exposure technology with depth of focus, but using the exposure technology with the parallel rays (X-ray) makes it possible to correctly transfer a mask pattern to a resist for forming the antenna elements. As a result of this, the antenna elements can be formed correctly. The antenna elements are made of a copper material (copper plating). The above-described embedded interconnections formed inside the insulator are also made of a copper material.

Note that a large quantity of integrated circuits 39 with antenna formed on the wafer is of, for example, 3 million pieces for the 300-millimeter diameter wafer, while 1.4 million for the 200-millimeter diameter wafer.

Figure 8A:
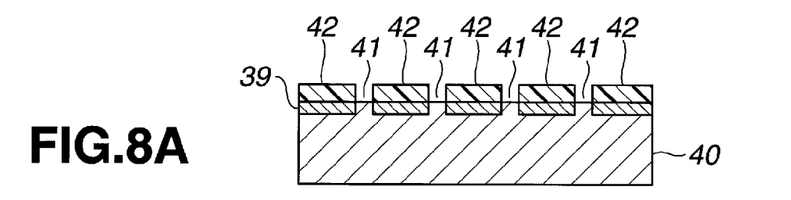
FIGS. 8A through 8G are sectional views showing configurations of a wafer and the powder particle corresponding to each process of the method for manufacturing the RF powder according to the first embodiment of the present disclosure.

Next, the mask pattern forming process S12 with the resist is performed (shown in FIG. 8A). A number of above-described integrated circuits are formed in an area near the front surface of a wafer 40 shown in FIG. 8A by the above-described device forming process S11, and the antenna elements are also formed corresponding to respective integrated circuits on the insulating film on the front surface of the wafer 40. On the wafer 40 on which a large number of integrated circuits and antenna elements are formed by the device forming process S11, resist mask patterns 42 are formed except for dicing lines 41 with a width of less than 50 micrometers, preferably in a range of approximately 10 to 30 micrometers by a lithography process. In FIG. 8A, each of a plurality of resist mask patterns 42 corresponds to the set of integrated circuits, namely, the above-described integrated circuit elements 39 with antenna.

Figure 8B:
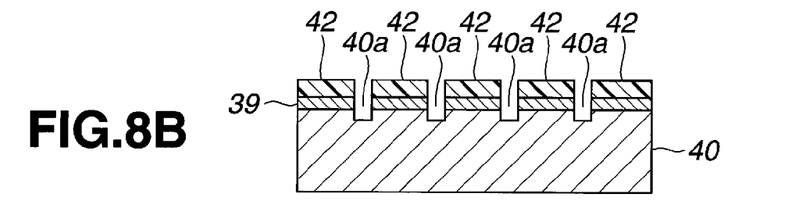

FIG. 8B shows a result of the gas dicing process S13 performed on the wafer 40. According to the gas dicing process S13, in the front surface of the wafer 40, deep etching is performed on the dicing lines 41 which are set based on the resist mask patterns 42 to a depth of 50 to 100 micrometers by plasma etching or the like. The gas dicing process S13 is performed to form grooves 40a, for example, to a depth of approximately two times or more of a long side of the integrated circuit element 39 with antenna without cutting or separating the wafer 40. Hereinafter, these grooves 40a will be called the "cut grooves." A number of rectangular-net-like cut grooves 40a for separating the integrated circuit elements 39 with antenna in the subsequent process are formed on the wafer 40 by the gas dicing process S13 as shown in FIG. 8B.

Figure 8C:
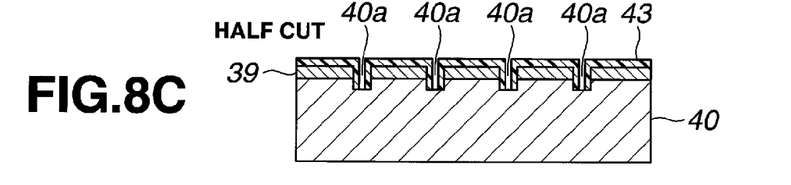
Figure 8D:
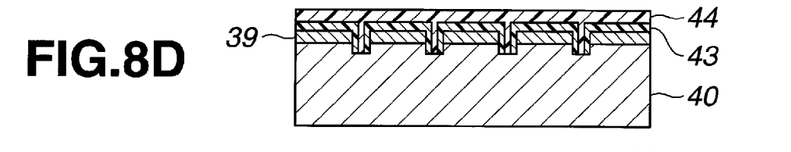

In the subsequent protection film forming process S14, a protection film 43 such as a silicon nitride film (SiN) or the like is formed with a required thickness by plasma CVD (plasma chemical vapor deposition) on the front surface of the wafer 40 from which the above-described resist mask patterns 42 have been removed (shown in FIG. 8C). The protection film 43 is formed up to inner surfaces of the cut grooves 40a. Note that a process of removing the resist patterns 42 which precedes the protection film forming process S14 is omitted in FIGS. 8A through 8G.

Figure 8E:
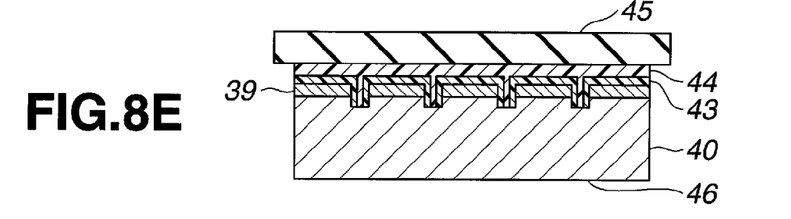
Figure 8F:
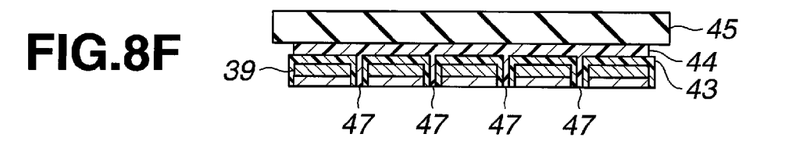
Figure 8G:
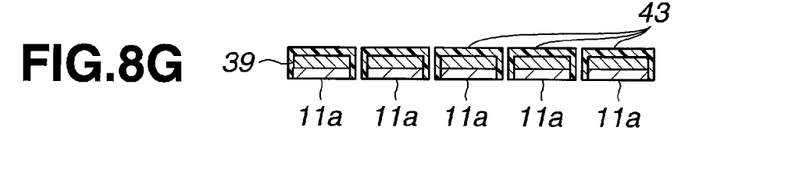

Furthermore, in the subsequent ceramic plate pasting process S15, for example, paraffin 44 which acts as an adhesive and solidifying agent is coated on the front surface of the wafer (shown in FIG. 8D), and the wafer 40 is then pasted on a ceramic plate 45 which has a required strength (shown in FIG. 8E). As a desirable state, the whole inside of the above-described cut grooves 40a is filled with the paraffin 44 and all the cut grooves 40a are embedded with the paraffin 44. The paraffin 44 becomes solidified after cooling. An adhesive and solidifying material which is dissolved by an organic solvent can be used in general, instead of the above-described paraffin 44.

In the following polishing process S16, a back surface 46 of the wafer 40 is polished. In this polishing process S16, the back surface 46 of the wafer 40 is polished until the polishing reaches bottoms 47 of the cut grooves 40a formed on the front surface and the paraffin 44 in the bottoms 47 is exposed (shown in FIG. 8F). Mechanical polishing is typically used in this back surface polishing. The polishing process may be completed only by performing mechanical polishing. This is because even when the back surface 46 is polished to the bottoms of the cut grooves 40a, the above-described solidified paraffin 44 is embedded inside the cut grooves 40a, and thus problems such as cracks, chaps, or the like hardly occurs. It should be noted that the polishing method is not limited only to mechanical polishing but other etching, chemical mechanical polishing, or the like may also be used in the back surface polishing, and naturally, these various kinds of polishing may be combined.

In the last separating process S17, temperature is increased to dissolve the above-described paraffin 44 by chemicals. After the paraffin 44 is dissolved, the ceramic plate 45 is removed and then portions of the wafer 40 on which the integrated circuit elements 39 with antenna are formed are separated therefrom as the above-described powder particles 11a (shown in FIG. 8G). In this way, a large quantity of powder particles 11a are produced from one wafer 40. Each powder particle 11a has the integrated circuit element 39 with antenna composed of the integrated circuit, the antenna element, or the like, and this integrated circuit element 39 with antenna is further protected by the protection film 43.

As described above, the RF powder 11 according to the first embodiment illustrated in FIGS. 1 through 6 can be formed. According to this manufacturing method, since the protection film forming process S14 for covering with the protection film 43 the circumference of the integrated circuit elements 39 with antenna in the powder particle 11a is performed before separating the powder particles 11a, the protection film 43 can be uniformly attached to the integrated circuit element 39 with antenna provided in each powder particle 11a. Incidentally, while the mask pattern forming method by the resist is exemplified in the present embodiment, a mask pattern forming method by photosensitive polyimide or the like achieves a similar effect to that of the present embodiment.

Next, with reference to FIGS. 9 through 11, a second embodiment of the RF powder according to the present disclosure will be explained.

Figure 9:
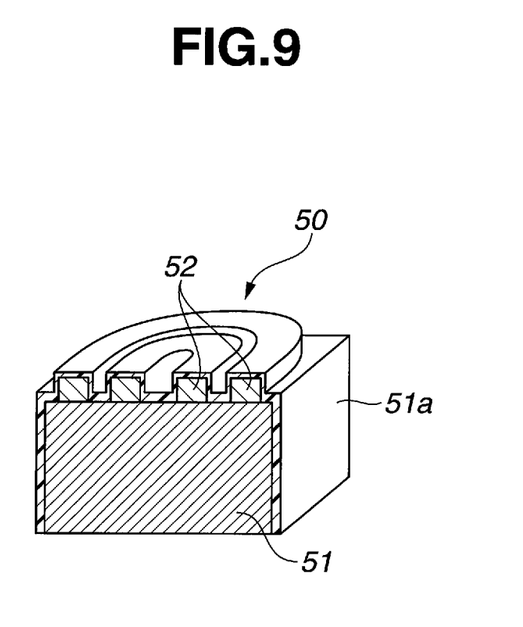
FIG. 9 is a perspective view showing a cross section of a part of a single powder particle of RF powder according to a second embodiment of the present disclosure.
Figure 10:
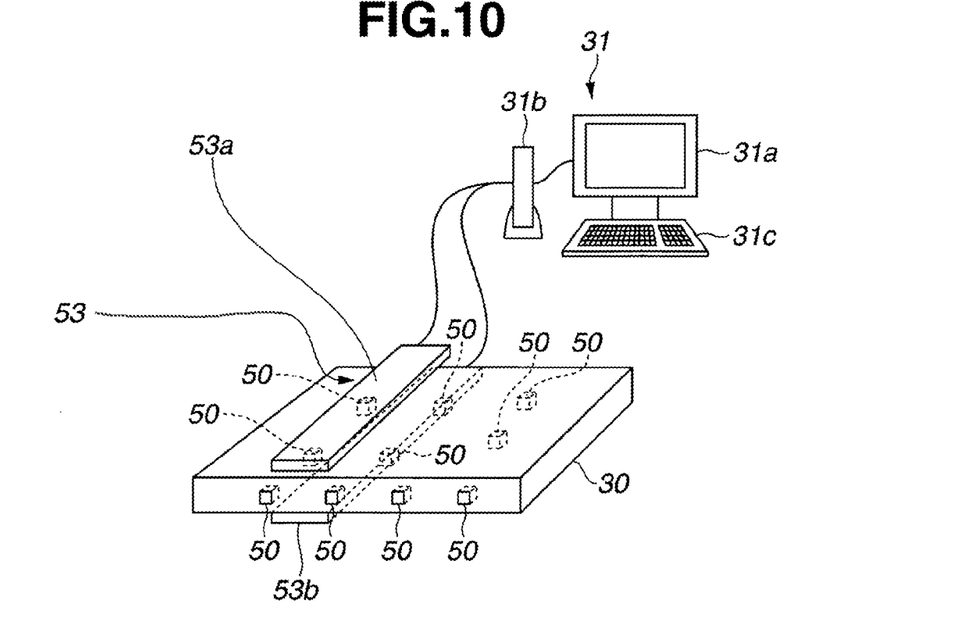
FIG. 10 is a view illustrating an actual application of the RF powder according to the second embodiment.
Figure 11:
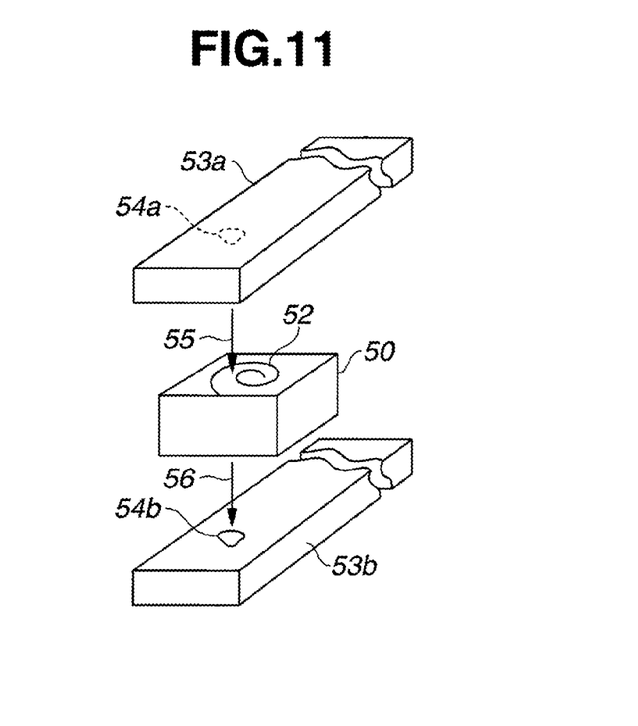
FIG. 11 is a view showing a transmission/reception relation of a radio-frequency electromagnetic wave with a reader/writer in an existence position of a single powder particle in the second embodiment.

In FIGS. 9 through 11, the same numerals are given to the same components as the components explained in the above-described first embodiment.

FIG. 9 is an external perspective view of a cross section of a part of a single powder particle 50. The powder particle 50 is the particle stored and managed in the container 1 as shown in FIG. 1, and is used in an aspect shown in FIG. 2. A size of the powder particle 50 is the same as the above-described powder particle 11a. The powder particle 50 has resonators 52 formed on a substrate 51 such as silicon or the like. The resonator 52 is formed with a capacitive element and an inductive element using the antenna and the insulator. Reference numeral 51a in the figure denotes a protection film such as SiN or the like. The resonator 52 has a function well responsive to a specific frequency, for example, the 2.45 GHz radio-frequency electromagnetic field. When the reader/writer is formed with an inductance element, a responsive frequency changes due to mutual inductance according to proximity. The reader/writer is designed in consideration of it. When the responsive frequency is fixed to a specific value, it is also possible to fix it more actively by the integrated circuit from a design point of view.

Next, with reference to FIGS. 10 and 11, an actual use example of the RF powder according to the second embodiment will be explained. FIG. 10 and FIG. 11 are figures similar to the above-described FIG. 5 and FIG. 6, respectively. A number of powder particles 50 of the RF powder according to the present embodiment are attached on the surface of the sheet member 30, or embedded thereinside in a manner similar to that of the first embodiment described above.

The sheet member 30 which contains a large number of powder particles 50 is read by a reader/writer 53 connected to the computer 31. The reader/writer 53 has an electromagnetic wave radiation part 53a and an electromagnetic wave detection part 53b. The electromagnetic wave radiation part 53a is arranged on the top of the sheet member 30, while the electromagnetic wave detection part 53b is arranged on the bottom of the sheet member 30. The electromagnetic wave radiation part 53a and the electromagnetic wave detection part 53b have a position relation of disposing the sheet member 30 therebetween, wherein they are located in the same positions of the upper and lower sides of the sheet member and are moved in a predetermined direction keeping the same position relation. Further, in the reader/writer 53, the electromagnetic wave radiation part 53a has an electromagnetic wave radiation terminal 54a, while the electromagnetic wave detection part 53b has an electromagnetic wave detection terminal 54b. The electromagnetic wave radiation terminal 54a of the electromagnetic wave radiation part 53a and the electromagnetic wave detection terminal 54b of the electromagnetic wave detection part 53b synchronously move along the front surface and the back surface of the sheet member 30 to thereby scan the sheet member 30. The reader/writer 53 performs a detecting operation at each scanning position using the above-described frequency included in the specific frequency band.

FIG. 11 shows a connection relation between the reader/writer 53 and the radio-frequency electromagnetic field in an existence position of a certain powder particle 50 contained in the RF powder according to the present embodiment. When the electromagnetic wave radiation terminal 54a of the electromagnetic wave radiation part 53a performs a scanning operation to reach a position above the powder particle 50, it changes the frequency to then radiate the radio-frequency electromagnetic field, and when the electromagnetic field with the frequency to which the powder particle 50 is responsive is radiated, the resonator 52 resonates in the powder particle 50, and electromagnetic field energy (an arrow 55) is absorbed in the powder particle 50. Further, in the powder particle 50, the electromagnetic wave detection terminal 54b of the electromagnetic wave detection part 53b detects an electromagnetic wave (an arrow 56) whose intensity is reduced due to the electromagnetic wave absorption. Information on the detected value detected by the electromagnetic wave detection part 53b is sent to the computer 31, and data on an absorption amount of the electromagnetic wave in the scanning position is memorized in a memory of the computer.

The reader/writer 53 scans over the whole sheet member 30 shown in FIG. 10, and thus the data on the amount of electromagnetic absorption by the RF powder (a large number of the powder particles 50) in the whole area of the sheet member 30 is memorized in the computer 31. The information memorized in the memory of the computer 31 is displayed on the display 31a thereof if needed.

The RF powder according to the second embodiment can be used for forgery discrimination of bills or authentication of important documents, or the like in a manner similar to that of the RF powder according to the first embodiment described above, In this case, since the RF powder is used as a powder, the treatment is easy.

Since the method for manufacturing the RF powder according to the second embodiment differs only in that the resonators are formed instead of forming the integrated circuit elements in the device forming process S11 in the method for manufacturing the RF powder 11 according to the first embodiment described above and the other processes are the same as those in the above-described first embodiment, explanations thereof will be omitted.

Configurations, shapes, sizes, and arrangement relations explained in the above embodiments are just schematically illustrated enough to understand and carry out the present disclosure, and values and compositions (materials) of each configuration are also only illustrations. Therefore, the present disclosure is not limited to the foregoing embodiments, but can be changed into various forms, without departing from the scope of technical ideas described in the claims.

The RF powder according to the present disclosure is applicable to powder components as information recording media used for authentication of documents, forgery discrimination of bills, or the like.

What is claimed is:

1. A method for manufacturing a radio frequency (RF) powder comprising a plurality of RF particles, each RF particle comprising a circuit element, the method comprising:
    forming a plurality of circuit elements, each corresponding to a different RF particle, on a first surface of a substrate, the substrate further including a second surface that is opposite the first surface;
    etching grooves into the first surface of the substrate between the plurality of circuit elements;
    forming a protective material over and in direct contact with surfaces of each of the plurality of circuit elements and the substrate defining sidewalls of each of the grooves such that a surface of the substrate at a bottom of each of the grooves remains exposed;
    forming an adhesive material over the protective material and filling the grooves in the surface of the substrate on which the plurality of circuit elements are formed before removing the substrate; and
    removing a first portion of the substrate between the second surface of the substrate and bottoms of the grooves so that each of the plurality of circuit elements is associated with a different remaining portion of the substrate.

2. The method of claim 1, wherein removing the first portion of the substrate comprises removing a volume of the substrate defined between the second surface of the substrate and the surfaces of the protective material on the sidewalls of each of the grooves to expose surfaces of the protective material that overlie the sidewalls of each of the grooves.

3. The method of claim 1, wherein further comprising forming an insulating material and an antenna element on each of the plurality of circuit elements prior to forming the protection film, wherein each of the RF particles includes an integrated circuit, an insulating material, and an antenna element.

4. The method of claim 1, forming the adhesive material comprises filling portions of the grooves that remain between the protective material to cover the surface of the substrate at the bottom of each of the grooves.

5. The method of claim 1, further comprising attaching a support plate to the adhesive material adjacent the first surface of the substrate.

6. The method of claim 5, further comprising removing the adhesive material such that the support plate separates from each of the plurality of integrated circuit elements to form the RF particles of the plurality, wherein each of the RF particles is disconnected from each other RF particle.

7. The method of claim 1, wherein the plurality of circuit elements comprise a plurality of resonators.

8. The method of claim 1, wherein each of the plurality of RF particles includes:
a circuit element of the plurality overlying another substrate;
an insulating layer overlying the circuit element;
at least one antenna element disposed in the insulating layer and having an exposed surface; and
at least one interconnection extending from the circuit element to the antenna element.

9. A method for manufacturing a radio frequency (RF) powder comprising a plurality of RF particles, each RF particle comprising an integrated circuit, the method comprising:
forming a plurality of integrated circuits, each corresponding to a different RF particle of the plurality of RF particles, on a first surface of a substrate, the substrate further including a second surface that is opposite the first surface;
etching grooves into the first surface of the substrate between the plurality of integrated circuits;
forming a protection film directly on each of the plurality of integrated circuits and at least partially over surfaces within the grooves such that portions of the substrate at the bottoms of each of the grooves are exposed;
attaching a strengthening plate to the protection film with an adhesive that overlies the protective material fills remaining portions of the grooves;
removing a first portion of the substrate between the second surface of the substrate and bottoms of the grooves so that each of the plurality of integrated circuits is associated with a different remaining portion of the substrate; and
removing the adhesive to release the plurality RF particles from the support plate and from one another such that each RF particle of the plurality is disconnected from each other RF particle of the plurality.

10. The method of claim 9, further comprising forming an insulating material and an antenna element on each of the plurality of integrated circuits prior to forming the protection film on each of the plurality of integrated circuits such that each of the RF particles includes a corresponding one of the plurality of integrated circuits, an insulating material, and an antenna element.

11. The method of claim 10, wherein for each RF particle disconnected from each other RF particle, the protection film and a corresponding one of the different remaining portions of the substrate encapsulate a corresponding integrated circuit, insulating material, and antenna element of each RF particle.

12. The method of claim 9, further comprising:
prior to etching grooves into the first surface of the substrate between the plurality of integrated circuits, applying a mask pattern to the plurality of integrated circuits such that etching of the grooves is confined to areas between the plurality of integrated circuits; and
prior to forming the protection film on each of the plurality of integrated circuits, removing the mask pattern.

13. The method of claim 9, wherein forming the protection film comprises forming the protection film deposition to have a substantially uniform thickness.

14. The method of claim 9, wherein each of the plurality of RF particles includes:
an integrated circuit of the plurality overlying and in direct contact with another substrate;
an insulating layer overlying and in direct contact with the integrated circuit such that the integrated circuit is positioned between the substrate and the insulating layer;
an antenna element overlying and in direct contact with the insulating layer; and
at least one interconnection coupling the integrated circuit with the antenna element.

15. A method for manufacturing a radio frequency (RF) powder comprising a plurality of RF particles, each RF particle comprising a resonance circuit, the method comprising:
forming a plurality of resonators, each corresponding to a different RF particle, on a first surface of a substrate, the substrate further including a second surface that is opposite the first surface;
etching grooves into the first surface of the substrate between the plurality of resonators;
forming a protection film on each of the plurality of resonators over sidewalls defined by vertical, planar surfaces of the plurality of resonators and the substrate within the grooves;
forming an adhesive over exposed surfaces of the protection film and exposed portions of the first surface of the substrate at the bottoms of the grooves;
attaching a strengthening plate to the adhesive;
removing a first portion of the substrate that is between the second surface of the substrate and bottoms of the grooves so that each of the plurality of resonators is associated with a different remaining portion of the substrate; and
removing the adhesive such that the support plate separates from the RF particles leaving each RF particle disconnected from each other RF particle.

16. The method of claim 15, wherein the strengthening plate comprises a ceramic plate.

17. The method of claim 15, wherein forming the adhesive comprises forming the adhesive in direct contact with the exposed surfaces of the protection film and the exposed portions to substantially fill each of the grooves.

18. The method of claim 15, wherein for each RF particle disconnected from each other RF particle, the protection film and a corresponding one of the different remaining portions of the substrate encapsulate a corresponding resonator of each RF particle.

19. The method of claim 15, wherein forming the protection film further comprises leaving surfaces of the substrate at the bottoms of the grooves exposed.

20. The method of claim 15, wherein each of the plurality of RF particles includes:

a resonator of the plurality overlying and in direct contact with another substrate;

an insulating layer overlying and in direct contact with the resonator such that the resonator is positioned between the substrate and the insulating layer;

an antenna element overlying and in direct contact with the insulating layer; and at least one interconnection coupling the integrated circuit with the antenna element.

\* \* \* \* \*

UNITED STATES PATENT AND TRADEMARK OFFICE
CERTIFICATE OF CORRECTION

| | | |
|---|---|---|
| PATENT NO. | : 8,440,487 B2 | Page 1 of 1 |
| APPLICATION NO. | : 13/404667 | |
| DATED | : May 14, 2013 | |
| INVENTOR(S) | : Furumura | |

It is certified that error appears in the above-identified patent and that said Letters Patent is hereby corrected as shown below:

On Title Page 2, item (56), under "OTHER PUBLICATIONS", in Column 2, Line 15, delete "Pllytronic," and insert -- Polytronic, --, therefor.

On Title Page 2, item (56), under "OTHER PUBLICATIONS", in Column 2, Line 24, delete "Microwane" and insert -- Microwave --, therefor.

In the Specification:

In Column 1, Line 62, delete "order so" and insert -- order to --, therefor.

In Column 3, Line 5, delete "particle" and insert -- particle. --, therefor.

In Column 6, Line 10, delete "31 a" and insert -- 31a --, therefor.

In the Claims:

In Column 11, Line 10, in Claim 4, delete "forming" and insert -- wherein forming --, therefor.

In Column 11, Line 55, in Claim 9, delete "plurality RF" and insert -- plurality of RF --, therefor.

Signed and Sealed this
First Day of October, 2013

Teresa Stanek Rea
*Deputy Director of the United States Patent and Trademark Office*